United States Patent
Dayka et al.

(10) Patent No.: US 9,906,517 B2
(45) Date of Patent: *Feb. 27, 2018

(54) CROSS-SITE REQUEST FORGERY (CSRF) PREVENTION

(71) Applicant: International Business Machines Corporation, Armonk, NY (US)

(72) Inventors: John C. Dayka, New Paltz, NY (US); Michael P. Kasper, Poughkeepsie, NY (US); Eysha S. Powers, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/179,435

(22) Filed: Jun. 10, 2016

(65) Prior Publication Data
US 2017/0149768 A1    May 25, 2017

Related U.S. Application Data

(63) Continuation of application No. 14/949,304, filed on Nov. 23, 2015.

(51) Int. Cl.
*H04L 29/06* (2006.01)
*H04L 9/32* (2006.01)
*G06F 7/04* (2006.01)

(52) U.S. Cl.
CPC .......... *H04L 63/0823* (2013.01); *H04L 63/10* (2013.01); *H04L 63/1466* (2013.01)

(58) Field of Classification Search
CPC .. H04L 63/0823; H04L 63/10; H04L 63/1466
(Continued)

(56) References Cited

U.S. PATENT DOCUMENTS 9,426,171 B1 * 8/2016 Jezorek ............... H04L 63/1433
2005/0198494 A1 * 9/2005 Ishibashi ............... H04L 9/3213
713/155

(Continued)

OTHER PUBLICATIONS

List of IBM Patents or Patent Applications Treated as Related; (Appendix P), Filed Nov. 23, 2015; 2 pages.

(Continued)

*Primary Examiner* — Aravind Moorthy
(74) *Attorney, Agent, or Firm* — Cantor Colburn LLP; William A. Kinnaman, Jr.

(57) ABSTRACT

A computer program product for cross-site request forgery (CSRF) prevention is provided and includes a computer readable storage medium having program instructions embodied therewith. The program instructions are readable and executable by a processing circuit to cause the processing circuit to issue a server request for a certificate, which is associated with a user, responsive to a client request to visit a uniform resource indicator (URI) being received, validate the certificate upon receipt in fulfillment of the server request, compare a referrer listed in a header of the client request with a list of certificate elements in the certificate, authenticate the user in accordance with correlation between the referrer and at least one of the certificate elements and authorize the client request to visit the URI upon the user being authenticated.

5 Claims, 8 Drawing Sheets

(58) Field of Classification Search
USPC ............................. 726/4; 713/156, 168, 175
See application file for complete search history.

(56) References Cited

U.S. PATENT DOCUMENTS

2014/0259132 A1\* 9/2014 Gough ................ H04L 63/0823
    726/6
2016/0352840 A1\* 12/2016 Negron ................... H04L 67/16
2017/0034168 A1\* 2/2017 Wilson ................... H04L 63/08

OTHER PUBLICATIONS

John C. Dayka et al., "Cross-Site Request Forgery (CSRF) Prevention", U.S. Appl. No. 14/949,304, filed Nov. 23, 2015.

\* cited by examiner

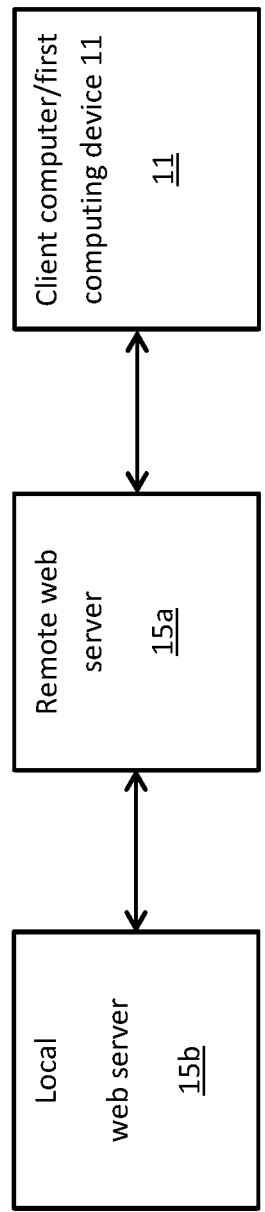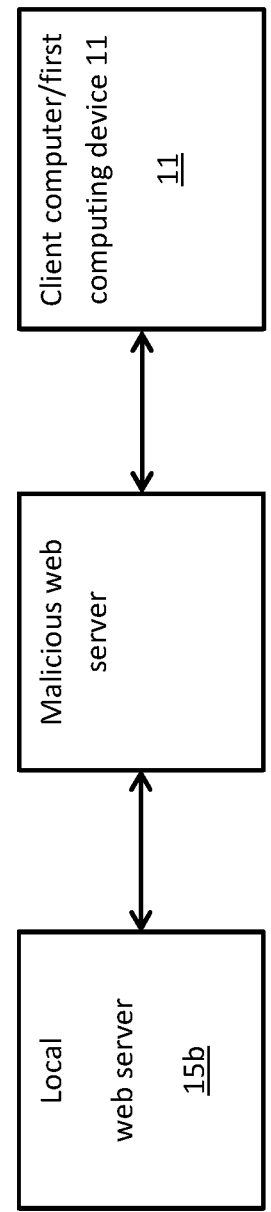

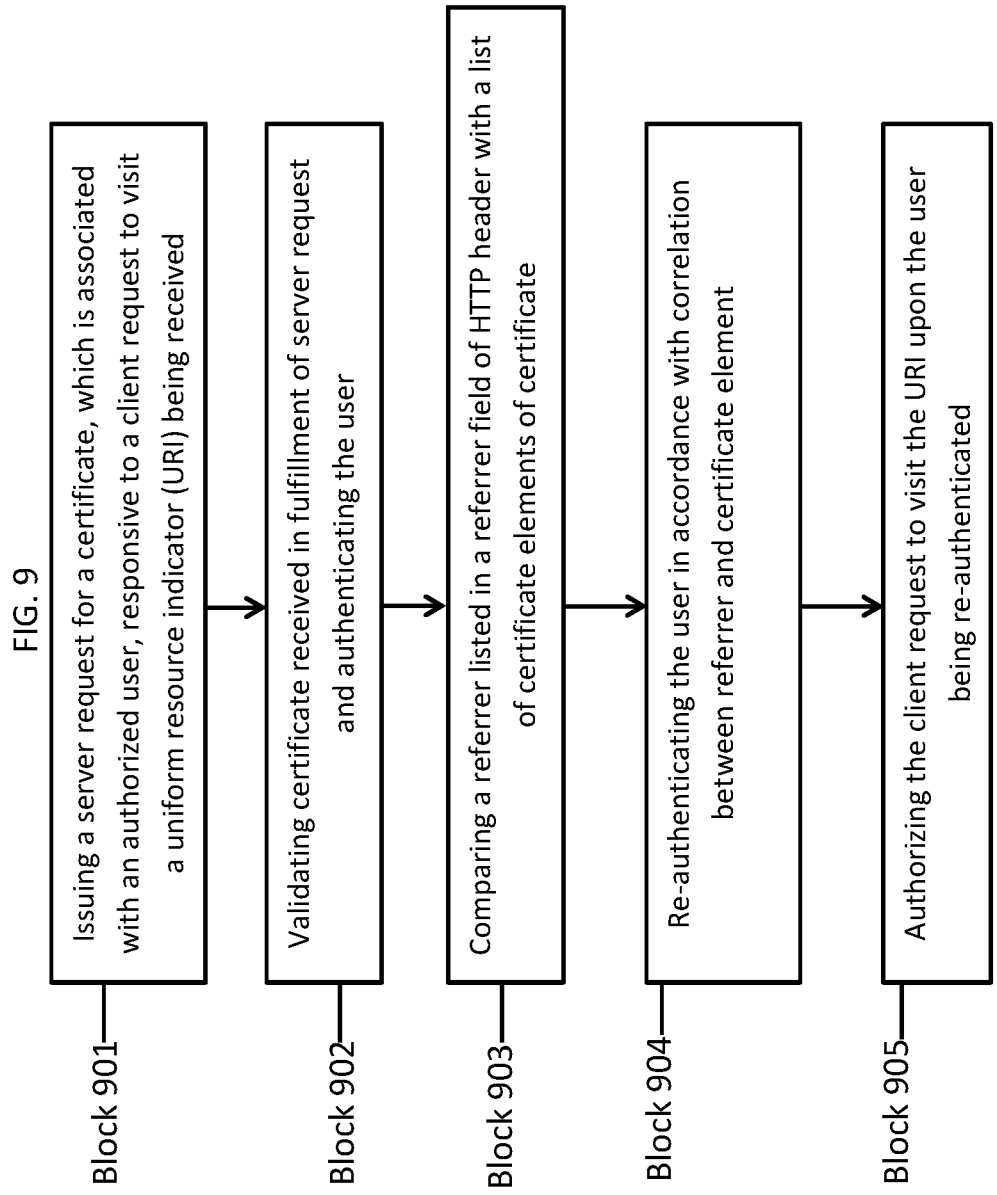

CROSS-SITE REQUEST FORGERY (CSRF) PREVENTION

CROSS-REFERENCE TO RELATED APPLICATION

This application is a continuation of and claims the benefit or priority to U.S. application Ser. No. 14/949,304, which was filed on Nov. 23, 2015. The entire contents of U.S. application Ser. No. 14/949,304 are incorporated herein by reference.

BACKGROUND

The present invention relates to a method of preventing cross-site request forgery (CSRF) and, more specifically, to a method of CSRF prevention that can be implemented at a server level.

CSRF is a type of an attack that tricks a victim into submitting a malicious request. It inherits the identity and privileges of the victim to perform an undesired function on the victim's behalf. For most sites, browser requests automatically include any credentials associated with the site, such as the user's session cookie, IP address, Windows domain credentials and so forth. Therefore, if the user is currently authenticated to the site, the site will have no way to distinguish between the forged request sent by the victim and a legitimate request sent by the victim.

CSRF attacks target functionality that causes a state change on the server, such as changing the victim's email address or password, or purchasing something. Forcing the victim to retrieve data doesn't benefit an attacker because the attacker doesn't receive the response, the victim does. As such, CSRF attacks target state-changing requests. It is sometimes possible to store the CSRF attack on the vulnerable site itself. Such vulnerabilities are called "stored CSRF flaws." This can be accomplished by simply storing a tag in a field that accepts HTML or by a more complex cross-site scripting attack. If the attack can store a CSRF attack in the site, the severity of the attack is amplified. In particular, the likelihood of the attack occurring is increased because the victim is more likely to view the page containing the attack than some random page on the Internet. The likelihood is also increased because the victim is probably authenticated to the site already.

Current solutions for CSRF prevention include whitelisting and the use of CSRF tokens. In white-listing solutions, existing applications create registries of accepted domains (i.e. HTTP referrers) that are allowed for a given application and then check the HTTP_REFERER and HTTP_ORIGIN fields (if any such fields exist) against those registries. The application thus needs to repeatedly manage and check the registries or permit external management using security profiles. This requires creating a new class of security profiles and authorities that are separate from the client certificates that are already being used to implement user authentication.

In the CSRF token approach, the application generates a token and passes it back to the client upon authentication. Subsequently, the client needs to pass in the token on each transaction with the server application needing to be modified to provide or accept the CSRF token and the client application needing to be modified to use the token. Unlike a cookie, the token would not be cached in the browser and there may be additional overheard required by the server and client applications. The CSRF token approach can also be defeated by attacks that submit requests twice.

SUMMARY

According to an embodiment of the present invention, a computer program product for cross-site request forgery (CSRF) prevention is provided and includes a computer readable storage medium having program instructions embodied therewith. The program instructions are readable and executable by a processing circuit to cause the processing circuit to issue a server request for a certificate, which is associated with a user, responsive to a client request to visit a uniform resource indicator (URI) being received, validate the certificate upon receipt in fulfillment of the server request, compare a referrer listed in a header of the client request with a list of certificate elements in the certificate, authenticate the user in accordance with correlation between the referrer and at least one of the certificate elements and authorize the client request to visit the URI upon the user being authenticated.

According to another embodiment of the present invention, a computer system for cross-site request forgery (CSRF) prevention is provided. The computer system includes a computer readable storage medium having instructions stored thereon that are executable by a processing circuit to cause the processing circuit to issue a server request for a certificate, which is associated with a user, responsive to a client request to visit a uniform resource indicator (URI) being received, validate the certificate upon receipt in fulfillment of the server request, compare a referrer listed in a header of the client request with a list of certificate elements in the certificate, authenticate the user in accordance with correlation between the referrer and at least one of the certificate elements and authorize the client request to visit the URI upon the user being authenticated.

According to yet another embodiment of the present invention, a computer-implemented method for cross-site request forgery (CSRF) prevention is provided and includes issuing a server request for a certificate, which is associated with a user, responsive to a client request to visit a uniform resource indicator (URI) being received, validating the certificate upon receipt in fulfillment of the server request, comparing a referrer listed in a header of the client request with a list of certificate elements in the certificate, authenticating the user in accordance with correlation between the referrer and at least one of the certificate elements and authorizing the client request to visit the URI upon the user being authenticated.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 2 is a schematic diagram of relationships between trustworthy computing devices;

FIG. 3 is a schematic diagram of relationships between both trustworthy and untrustworthy computing devices;

FIG. 9 is a flow diagram illustrating a computer-implemented method of CSRF prevention.

DETAILED DESCRIPTION

As will be described below, a computer program product, a computing system and a computer-implemented method are provided for CSRF prevention at the server level so that applications can benefit from CSRF protection without needing to be changed or modified.

Figure 1:
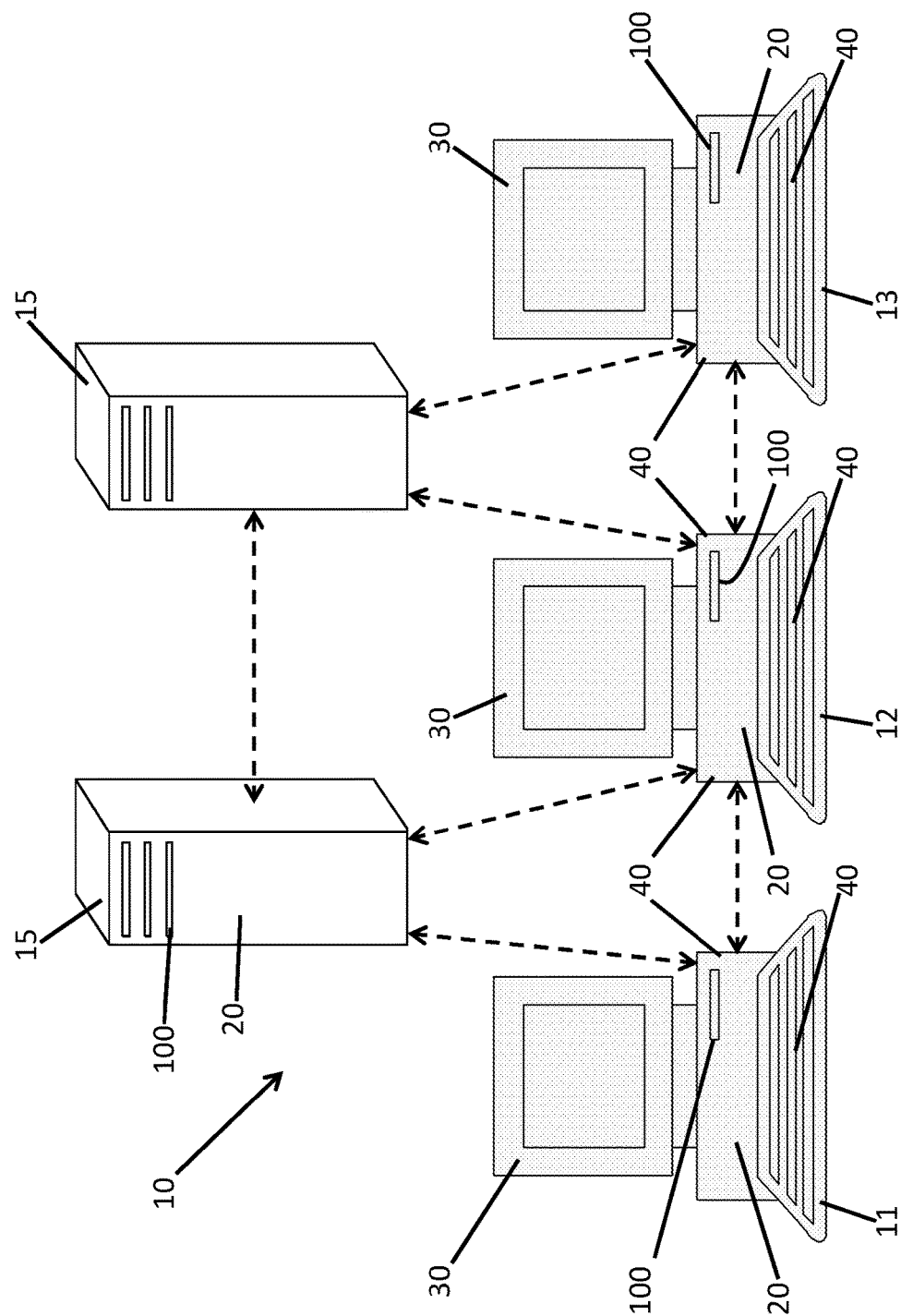
FIG. 1 is a schematic diagram of a computing system in accordance with embodiments.

With reference to FIGS. 1-3, a computing system 10 is provided and may be configured for example as an enterprise computing system or as a personal computing system. In either case, the first computing system 10 includes first, second and third computing devices 11, 12 and 13 and servers 15 which are configured to be networked together for communication purposes. Each of the first, second and third computing devices 11, 12 and 13 and the servers 15 may include among other features a processing circuit 20, a display 30, user input devices 40 and a networking unit as well as a computer program product 100 for CSRF prevention. The processing circuit 20 may be provided as a micro-processor, a central processing unit (CPU) or any other suitable processing device. The display 30 may be provided as a monitor and is configured to display data and information as well as a graphical user interface to an administrator or user. The user input devices 40 may be provided as a mouse and a keyboard combination and are configured to allow the administrator or user to input commands to the processing circuit 20. The networking unit may be provided as an Ethernet or other suitable networking device by which the first, second and third computing devices 11, 12 and 13 and servers 15 are communicative.

Within the context of the computing system 1, the first, second and third computing devices 11, 12 and 13 may each be provided as a user personal computer that is configured with a web browser for that is displayable to a user and usable for facilitating that user's ability to access the Internet. Of the servers 15 of the computing system 1, one may be provided as a remote server 15*a* and the other may be provided as a local web server 15*b* that hosts at least one or more universal resource identifiers (URIs) that the user wishes to visit by way of the remote server 15*a*. In such a case, the remote server 15*a* serves as a referring source or a referrer host and may either be a trustworthy as in FIG. 2 or untrustworthy as in FIG. 3. The latter situation would present a risk of a CSRF attack whereby the untrustworthy remote server 15 directly or indirectly tricks the user (or an entity impersonating the user) into submitting an untrustworthy request of the local web server 15*b*.

With the above in mind, the present disclosure relates to the use of existing or extended fields (e.g., an ALTName field, which can be filled with a domain name or a URI, or a proprietary certificate extension) associated with a client certificate to serve as a white-list. The certificate can be checked against information included within a client HTTP request that relates to the remote server 15*a* (i.e., a domain name or URI of the referrer host listed in the HTTP request) at the local web server 15*b* such that the solution can be available to any and all web applications without need for application changes. Additionally, by using certificates for white-listing, ownership of the white-listing can remain in the hands of certificate granting security administrators rather than, say, web administrators and, since the certificate may be digitally signed, tampering can be detected.

No additional parameters or steps are required for client applications or web applications that are using the service with a valid certificate. However, if an application wanted to provide a list of specific URIs as opposed to domain names as input during the client certificate creation process, the application could do so, as one embodiment of this invention. Providing specific URIs to white-list could limit "stored CSRF flaw" attacks.

Figure 4:
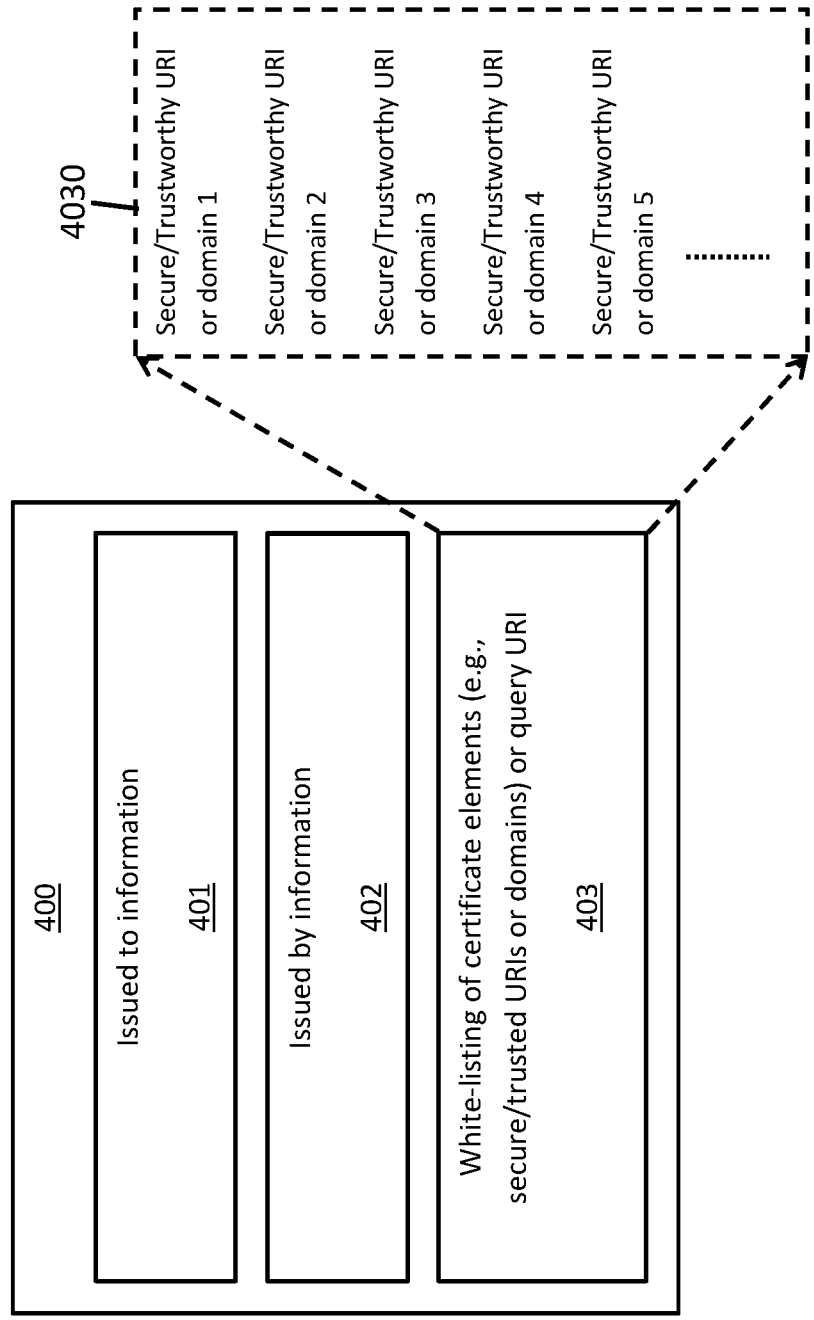
FIG. 4 is an illustration of a certificate of the computing system of FIG. 1 in accordance with embodiments.
Figure 5:
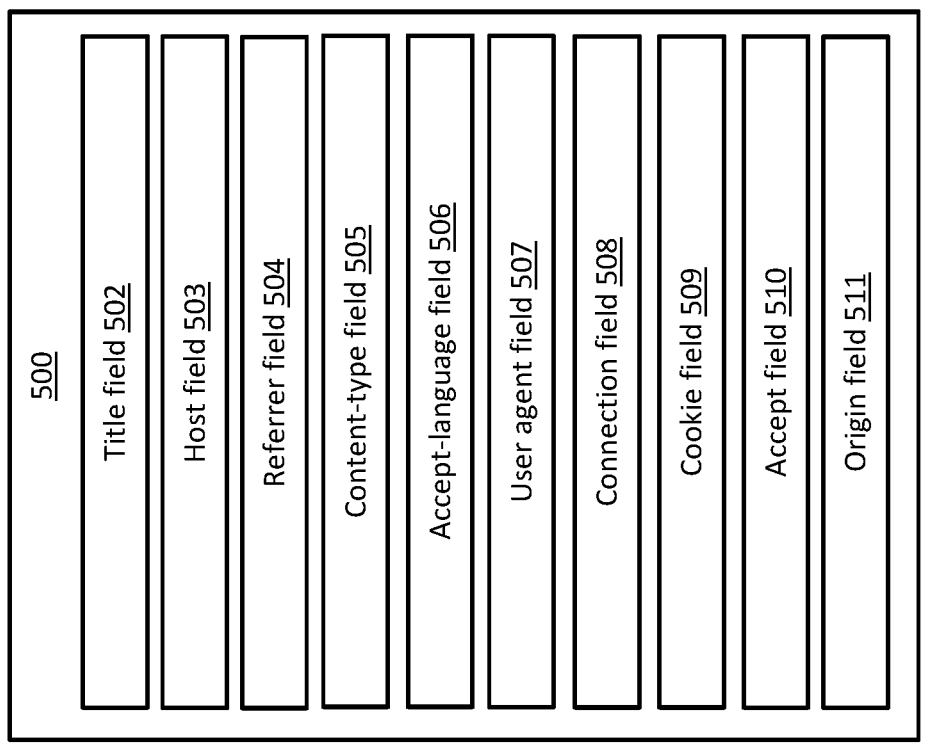
FIG. 5 is an illustration of an HTTP header of the computing system of FIG. 1 in accordance with embodiments.

With reference to FIGS. 4 and 5, examples of the client certificate and the HTTP request header are provided, respectively.

As shown in FIG. 4, the client certificate may be provided as a certificate 400 that includes a first certificate portion 401, a second certificate portion 402 and a third certificate portion 403. The certificate 400 could be generated manually using server commands, manually or automatically by hardware components or by software programs or manually or automatically through some other manual or automated method(s). The first certificate portion 401 may include information relating to an identification of an authorized user to whom the certificate 400 is issued. The second certificate portion 402 may include information relating to an identification of a granting authority of the certificate 400. The third certificate portion 403 may be blank, may include a static white-listing of certificate elements, such as secure/trustworthy URIs and/or domain names, or may include a URI that is configured to be queried for a dynamic white-listing of the certificate elements.

As shown in FIG. 5, the HTTP request header may be provided as a HTTP header 500 that is attached to a client request to visit a given URI and may include up to nine or more fields. The fields may include a header or title field 502, a host field 503 in which one or more URIs or domains of the client computer/first computing device 11 are to be listed, a referrer field 504, a content-type field 505, an accept-language field 506, a user agent field 507, a connection field 508, a cookie field 509, an accept field 510 and an optional origin field 511. Of these, the referrer field 504 and the origin field 511 (if any) can be un-populated, populated with a secure/trustworthy URI or domain name that is associated with the local web server 15*b*, populated with a secure/trustworthy URI or domain name that is unassociated with the local web server 15*b* or populated with an unsecure/untrustworthy URI or domain name.

Figure 6:
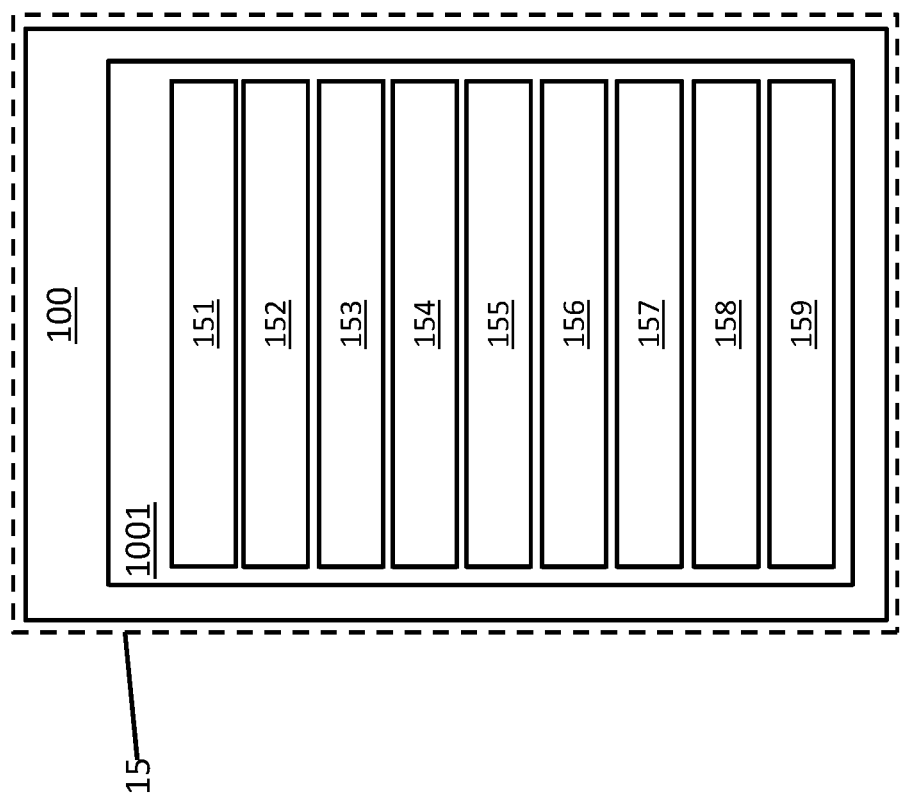
FIG. 6 is an illustration of a computer program product of the computing system of FIG. 1 in accordance with embodiments.

With reference to FIG. 6, the computer program product 100 includes a computer readable storage medium 1001 and may be installed in a memory unit of the first, second or third computing devices 11, 12 or 13 or one of the servers 15 of FIG. 1. For purposes of clarity and brevity, however, the following description will relate to the case where the computer program product is installed as the computer readable storage medium in the memory unit of one of the servers 15 (hereinafter referred to as "server 15") which is thus acting as the local web server 15*b* of FIGS. 2 and 3.

As shown in FIG. 6, the computer program product 100 includes multiple program instructions that are readable and executable by the processing circuit 20 of the local web server 15*b*. The multiple program instructions include first program instructions 151, which, when executed in response to a client request to visit a uniform resource indicator (URI) being received at the local web server 15b, cause the processing circuit 20 to either initially authenticate a user and to issue the certificate 400 to the initially authenticated user or to issue a server request for certificate 400 that is associated with an authenticated user. The URI may be, but is not required to be, hosted by the local web server 15b.

The multiple program instructions further include second-sixth program instructions 152-156, which, when executed in response to the requested certificate 400 being received at the local web server 15b in fulfillment of the server request, cause the processing circuit 20 to validate the certificate 400, compare a referrer URI or domain name listed in the referrer field 504 or the origin field 511 of the HTTP header 500 with the list of certificate elements in the third portion 403 of the certificate 400 (e.g., the list of secure/trustworthy URIs or domains), re-authenticate the user with correlation between the referrer URI or domain name and at least one of the certificate elements in the list, authorize the client request to visit the URI upon the user being re-authenticated and deny the client request to visit the URI in accordance with dissociation between the referrer and origin URIs or domain names and at least one of the certificate elements in the list.

In accordance with instructions, the multiple program instructions may further include seventh-ninth program instructions 157-159. When executed, the seventh program instructions 157 cause the processing circuit 20 to store the certificate 400 upon receipt in fulfillment of the server request. When executed upon an initial authentication of the user, the eighth program instructions 158 cause the processing circuit 20 to generate the certificate 400 with the list of certificate elements in a static manner and the ninth program instructions 159 cause the processing circuit 20 to generate the certificate 400 with the list of certificate elements dynamically. In accordance with further embodiments, the generation of the list of certificate elements in the static manner may include a generation of the certificate 400 with the list of certificate elements included therein (e.g., in the third portion 403 or as a certificate 400 extension). By contrast, the generation of the list of certificate elements in the dynamic manner may include a configuration of the certificate 400 such that the third portion 403 includes a stored URI that can be queried to provide a dynamically updated list 4030 of secure/trustworthy URIs or domains.

Figure 7:
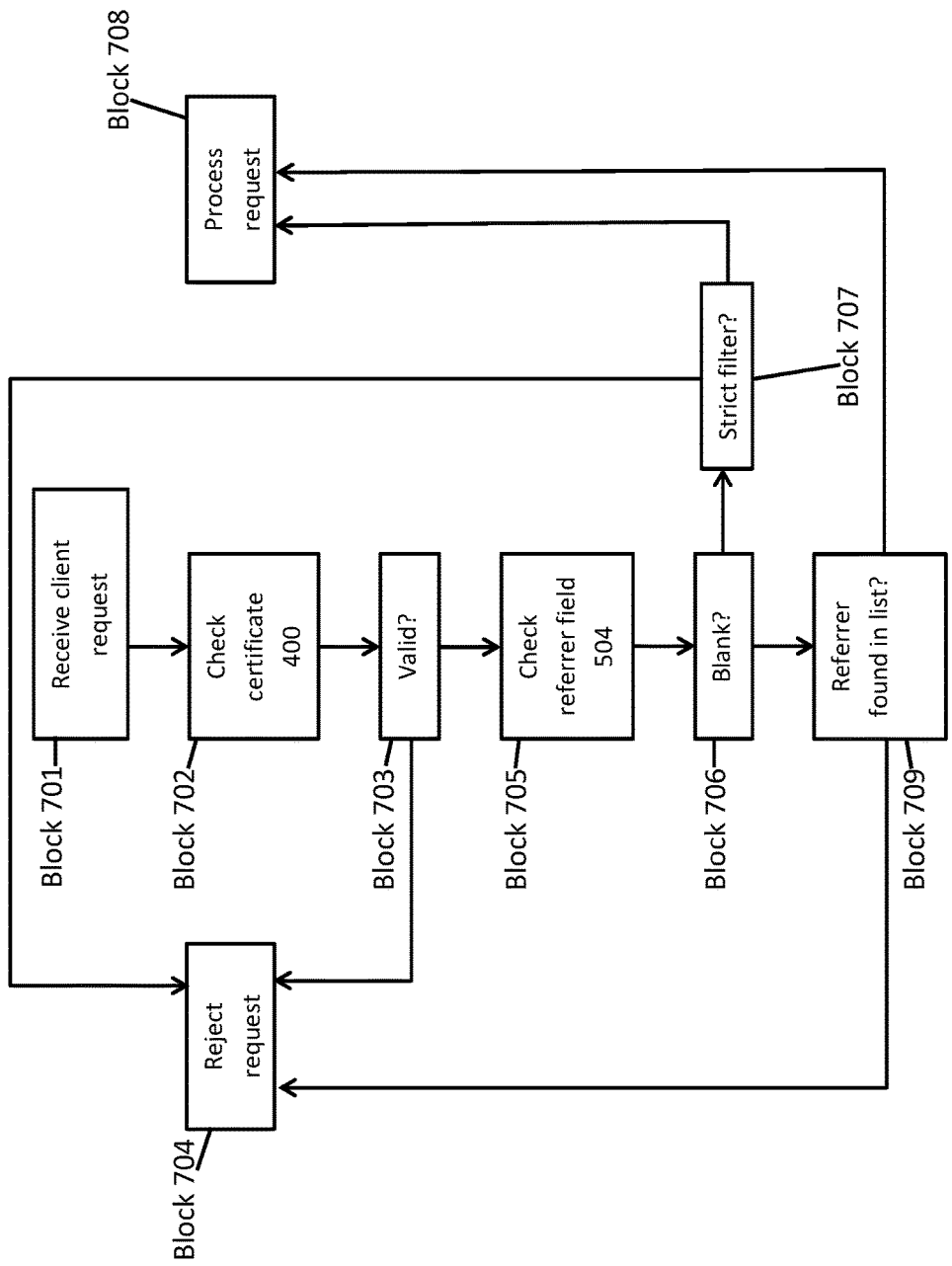
FIG. 7 is a flow diagram illustrating an operation of the computer program product of FIG. 6.

With reference to FIG. 7, an operation of a deployed version of the computer program product 100 will now be described. As shown in FIG. 7, a client HTTP request issued by a user by way of his client computer (e.g., first computing device 11 of FIG. 1) to visit a URI, which may be but is not required to be hosted by the local web server 15b, is received at the local web server 15b at block 701. The client computer/first computing device 11 is then prompted via a server request that may be transparent to the user for the certificate 400 if the certificate 400 has not already been stored (see, e.g., the seventh program instructions 157) and the certificate 400, which is subsequently presented in fulfillment of the server request, is checked at block 702 whereupon its validity is determined at block 703. In an event the certificate 400 is judged invalid, control proceeds to block 704 where the request is rejected. On the other hand, in an event the certificate 400 is judged to be valid, control proceeds to block 705 where the content of the referrer field 504 and the origin field 511 of the HTTP header 500 of the client HTTP request is checked.

At this point, at block 706, it is determined whether the referrer field 504 is blank and, in an event the referrer field 504 is determined to be blank, at block 707, it is determined whether a strict filter is engaged. In an event the strict filter is engaged, control proceeds to block 704 where the request is rejected. Alternatively, in an event the strict filter is not engaged, control proceeds to block 708 where the request is processed. In an event the referred field 504 or origin field 511 are populated, the content of the referrer field 504 and origin field 511 is compared to the static/dynamic list of certificate elements in the certificate 400 at block 709 and, in an event the content of the referrer field 504 or origin field 511 does not correlate with any one or more of the certificate elements in the list, control proceeds to block 704 where the request is rejected. Here, the computer program product 100 recognizes that the lack of correlation is an indication of an increased risk of a CSRF attack occurring and uses the request rejection as CSRF prevention. In an event the content of the referrer field 504 and origin field 511 both correlate with any one or more of the certificate elements in the list, control proceeds to block 708 where the request is processed.

While it is understood that the first-ninth program instructions 151-159 may be deployed by manual loading thereof directly into a client, server and/or proxy computer by way of a loadable storage medium, such as a CD, DVD, etc., or by being manually inserted into the computing device 11, the first-ninth program instructions 151-159 may also be automatically or semi-automatically deployed by being downloaded into client computers that will then execute the first-ninth program instructions 151-159. Alternatively, the first-ninth program instructions 151-159 may be sent directly to a client system via e-mail for detachment or loading into a directory or directly into a client computer hard drive. When there are proxy servers, loading processes will select proxy server codes, determine on which computers to place the proxy servers' codes, transmit the proxy server codes and then install the proxy server codes on proxy computers. The first-ninth program instructions 151-159 will then be transmitted to the proxy server and subsequently stored thereon.

Figure 8:
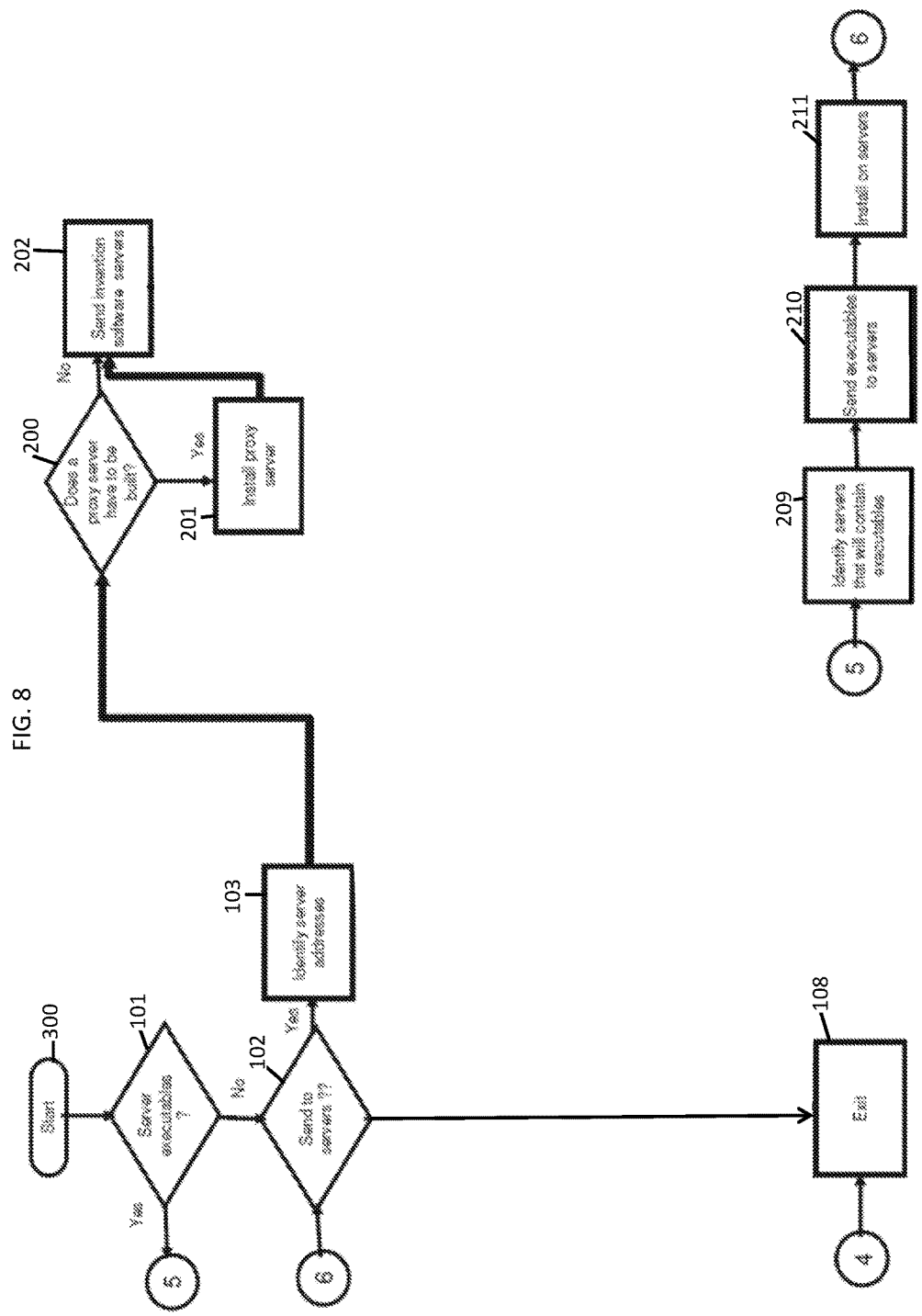
FIG. 8 is a flow diagram illustrating a deployment process of the computer program product of FIG. 6.

In accordance with embodiments and, with reference to FIG. 8, a deployment process of the computer program product described above is provided. The process begins at block 300 and at block 101 with a determination of whether the first-ninth program instructions 151-159 will reside on server 15 when executed. If so, then the server 15 is identified at block 209. The first-ninth program instructions 151-159 are then transferred directly to the server 15 storage via FTP or some other protocol or by copying though the use of a shared file system at block 210 such that the first-ninth program instructions 151-159 are installed on the servers at block 211.

Next, a determination is made on whether the first-ninth program instructions 151-159 are to be deployed by having users access to the first-ninth program instructions 151-159 on server 15 at block 102. If so, the server 15 addresses that will store the first-ninth program instructions 151-159 are identified at block 103 and a determination is made if a proxy server is to be built at block 200 for storage. A proxy server is a server that sits between a client application, such as a Web browser, of first computing device 11 and server 15 and operates by intercepting all requests to the server 15 to see if it can fulfill the requests itself (see, e.g., remote web server 15a of FIGS. 2 and 3). If not, the proxy server forwards the request to server 15. The two primary benefits of a proxy server are to improve performance and to filter requests.

If a proxy server is required, then the proxy server is installed at block 201 and the first-ninth program instructions 151-159 are sent via a protocol, such as FTP, or by being copied directly from the source files to the server 15 files via file sharing at block 202. Another embodiment involves sending a transaction to the (one or more) server 15 that contained the process software, and have the server 15 process the transaction and then receive and copy the process software to the server 15 file system. Once the process software is stored, the users may then access the first-ninth program instructions 151-159.

With reference to FIG. 9, a computer-implemented method for CSRF prevention is provided and includes issuing a server request for the certificate 400, which is associated with a user, responsive to a client request to visit a uniform resource indicator (URI) being received at block 901, validating the certificate 400 upon receipt thereof in fulfillment of the server request at block 902, comparing a referrer listed in the referrer field 504 or the origin field 511 of the HTTP header 500 with the list of certificate elements at block 903, re-authenticating the user in accordance with correlation between the referrer and at least one of the certificate elements at block 904 and authorizing the client request to visit the URI upon the user being re-authenticated at block 905.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for cross-site request forgery (CSRF) prevention, comprising:
    generating a certificate with issued-to and issued-by information and a list of certificate elements included therein or attached thereto, the certificate being associated with a user and the list of certificate elements comprising secure URIs, trustworthy URIs and domain names;
    issuing a server request for the certificate responsive to a client request to visit a uniform resource indicator (URI) being received;
    validating the certificate upon receipt in fulfillment of the server request;
    comparing a referrer listed in a header of the client request with the secure URIs, the trustworthy URIs and the domain names in the list of certificate elements;
    authenticating the user in accordance with a correlation between the referrer and at least one of the secure URIs, the trustworthy URIs and the domain names in the list of certificate elements; and
    authorizing the client request to visit the URI upon the user being authenticated.

2. The computer-implemented method according to claim 1, further comprising initially authenticating the user and issuing the certificate to the initially authenticated user.

3. The computer-implemented method according to claim 1, further comprising storing the certificate upon receipt in fulfillment of the server request.

4. The computer-implemented method according to claim 1, further comprising configuring the certificate to query the list of certificate elements.

5. The computer-implemented method according to claim 1, further comprising denying the client request in accordance with dissociation between the referrer and the certificate elements.

* * * * *